US009811359B2

(12) United States Patent
Bansal (10) Patent No.: US 9,811,359 B2
(45) Date of Patent: Nov. 7, 2017

(54) MFT LOAD BALANCER (71) Applicant: Oracle International Corporation, Redwood Shores, CA (US)

(72) Inventor: Ganesh Bansal, Ghaziabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 203 days.

(21) Appl. No.: 14/685,808

(22) Filed: Apr. 14, 2015

(65) Prior Publication Data

US 2015/0301839 A1    Oct. 22, 2015

Related U.S. Application Data (60) Provisional application No. 61/980,792, filed on Apr. 17, 2014.

(51) Int. Cl.
*G06F 15/177*    (2006.01)
*G06F 9/445*    (2006.01)
*H04L 12/24*    (2006.01)
*H04L 29/08*    (2006.01)
*G06F 9/44*    (2006.01)

(52) U.S. Cl.
CPC ........ *G06F 9/44505* (2013.01); *G06F 9/4445* (2013.01); *H04L 41/0806* (2013.01); *H04L 67/06* (2013.01); *H04L 67/1004* (2013.01)

(58) Field of Classification Search
CPC .......................... G06F 9/44505; G06F 9/4445
USPC .................................................. 709/222, 223
See application file for complete search history.

(56) References Cited

U.S. PATENT DOCUMENTS

| 8,850,002 | B1* | 9/2014 | Dickinson | H04L 47/70 370/395.32 |
| 8,949,658 | B1* | 2/2015 | Scanlan | G06F 11/3419 714/4.2 |
| 2002/0116479 | A1* | 8/2002 | Ishida | H04L 67/1008 709/220 |
| 2003/0014524 | A1* | 1/2003 | Tormasov | G06F 9/505 709/226 |
| 2005/0114429 | A1* | 5/2005 | Caccavale | G06F 9/505 709/200 |
| 2005/0149940 | A1* | 7/2005 | Calinescu | G06F 9/5061 718/104 |
| 2008/0072226 | A1* | 3/2008 | Armes | G06F 9/505 718/101 |
| 2010/0049842 | A1* | 2/2010 | Koski | H04L 67/2814 709/223 |

(Continued)

*Primary Examiner* — Philip B Tran
(74) *Attorney, Agent, or Firm* — Kilpatrick Townsend & Stockton LLP (57) ABSTRACT In various embodiments, a software load balancer is deployed to distribute incoming managed file traffic among multiple nodes running in a cluster. In one aspect, a separate instance of the software load balancer may be instantiated for each protocol that will be used (e.g., FTP, FTP-SSL & SSH-FTP). In one embodiment, the software load balancer includes a standalone java application that is configured to run outside the purview of an application server. In a further embodiment, the software load balancer is able to manage transfers to multiple nodes in (e.g., multiple managed file transfer servers) in a cluster. Therefore, in one embodiment, only one instance of the software load balance needs to be deployed.

20 Claims, 8 Drawing Sheets (56) References Cited

U.S. PATENT DOCUMENTS

2010/0223364 A1\* 9/2010 Wei .................. H04L 29/04
709/220

\* cited by examiner

MFT LOAD BALANCER

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

File transfer has been one of the most commonly used technologies across the world ever since it became practical to connect computers together with some mode of communication. Companies of all shapes and sizes have relied heavily in the past on this technology for the exchange of file-based information between different IT systems. In spite of the increasing importance of message-oriented middleware and the promises of service-oriented architecture (SOA), data exchange in the modern enterprise uses the simple process of transferring files. Recent government regulations such as HIPAA and Sarbanes-Oxley are calling for every process to be documented, auditable, and accountable, including those business processes that incorporate or leverage FTP. Therefore, it is becoming increasingly important for an organization's strategy to have enhanced file transfer capabilities as part of the overall integration strategy.

File transfer refers to technology provided to allow files to be passed from one application to another, with the other application running either on the same computing platform or on another system entirely. The logic customarily used is that as business applications are driven by files of data, which they process, then a way of linking two parts of the business together is to exchange files data the receiving application can process.

Traditional file transfer implementations generally have used a batch-style process. Information is gathered in one application/location/system and then passed to a different, possibly remote application for processing. For example, in a payroll processing system, time sheet information is gathered from all departments and locations within the company and batched together in data files, which are then transmitted to the corporate mainframe. There they are received and processed by the company payroll application, where payments are scheduled and pay-slip information is generated. This type of facility fulfilled a very basic level of application and system integration. However, it had some severe limitations. A number of these stemmed from the fact that when file transfer technology was created, most of the usage was in a batch style of operations. The new SEC-compliance requirement to Sarbanes-Oxley calls for every process to be documented, auditable, and accountable, including those business processes that incorporate or leverage FTP. It is becoming increasingly important for the organization's strategy to have managed file transfer capabilities as an integral part of overall integration strategy.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a software load balancer is deployed to distribute incoming managed file traffic among multiple nodes running in a cluster. In one aspect, a separate instance of the software load balancer may be instantiated for each protocol that will be used (e.g., FTP, FTP-SSL & SSH-FTP). In one embodiment, the software load balancer includes a standalone java application that is configured to run outside the purview of an application server. In a further embodiment, the software load balancer is able to manage transfers to multiple nodes in (e.g., multiple managed file transfer servers) in a cluster. Therefore, in one embodiment, only one instance of the software load balance needs to be deployed.

In further embodiments, deployment of an instance of the software load balancer is facilitated using a configuration file that includes a configuration required for running in instance of the software load balance.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Introduction

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Figure 1:
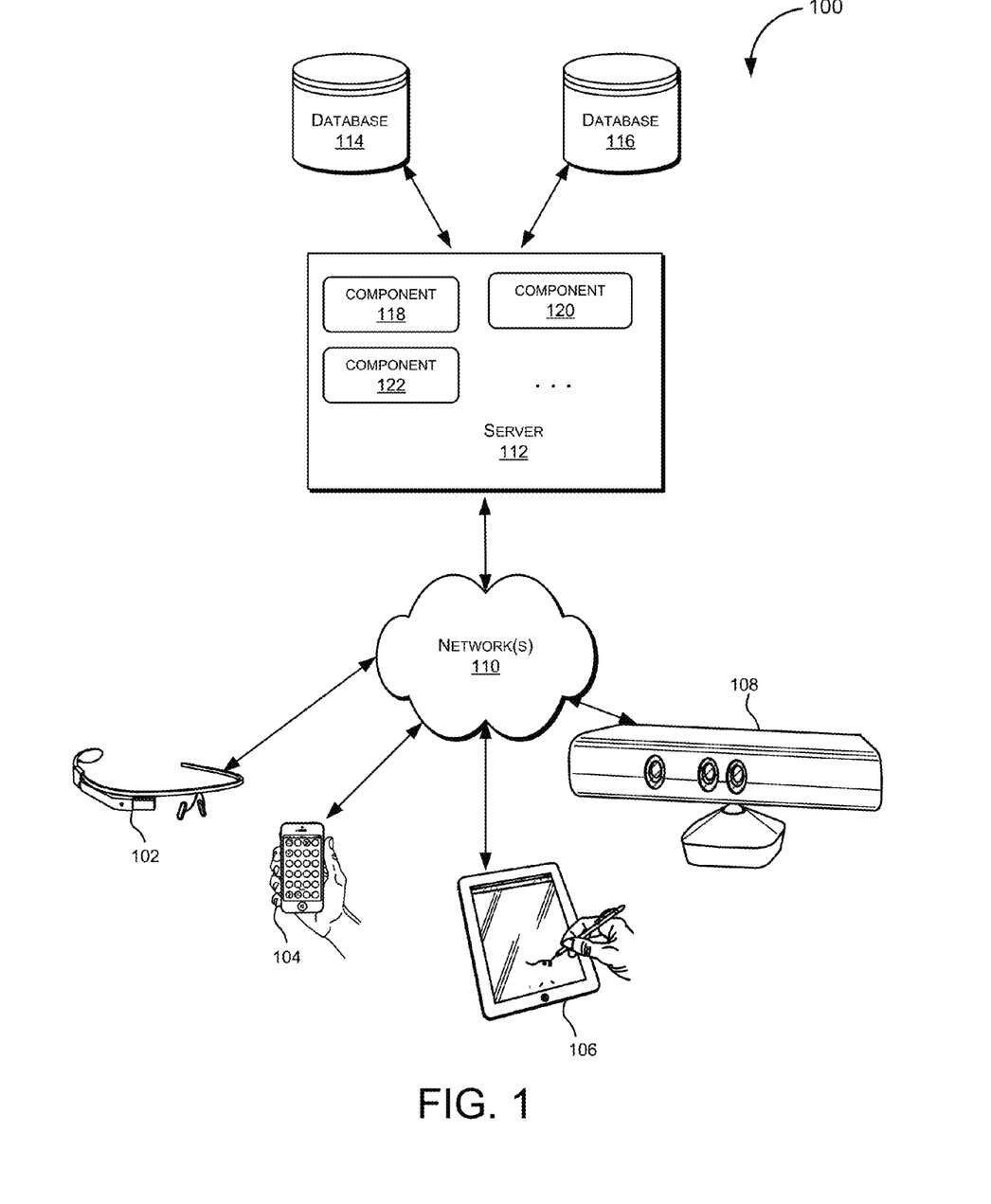
FIG. 1 depicts a simplified diagram of a distributed system for implementing one of the embodiments.

FIG. 1 depicts a simplified diagram of a distributed system 100 for implementing one of the embodiments. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 102.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Terminology

File—as used herein, a file refers to or represents an organized structure of similar data that can be made available to system users (including the system itself and its application programs) and be manipulated as a unit (for example, moved from one file directory to another).

File transfer—as used herein, a file transfer refers to or represents the movement of one or more electronic files from one location or machine to another.

Managed file transfer—as used herein, managed file transfer or MFT refers to or represents a technology to monitor, control, and secure aspects of data movement (including large bulk data) between any two entities.

Advanced managed file transfer—as used herein, advanced MFT refers to or represents the integration and management of all file transfers inside and outside an organization to satisfy security, regulatory, and business-process requirements. In one aspect, advanced MFT may include total control of all data transfers, including complete auditability, security, automation, and end-to-end processing.

Managed File Transfer

Figure 2:
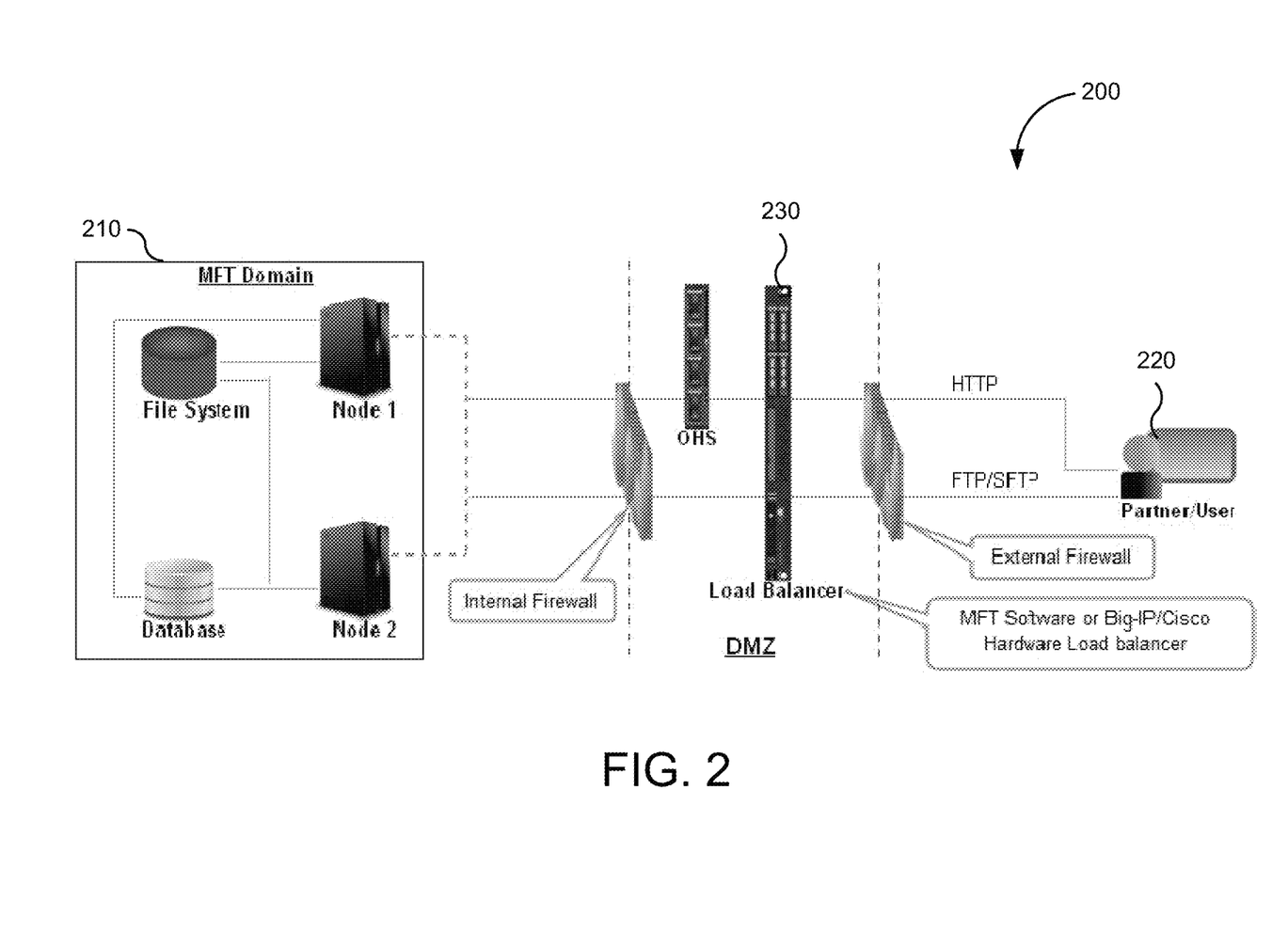
FIG. 2 depicts a simplified diagram of a system implementing load balancing for managed file transfer in one embodiment according to the present invention.

FIG. 2 depicts a simplified diagram of system 200 implementing load balancing for managed file transfer in one embodiment according to the present invention. FIG. 2 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, system 200 provides transfers between systems in a managed and auditable way, regardless of file size or operating systems. Such transfers may be internal, external and ad-hoc data transfers through one or more network between MFT domain 210 and user 220. User 220 may be an individual user, a process, or another system. In general, managed file transfer occurs using one or more protocols, such as the FTP protocol. Because some federal regulations require that certain types of communications meet strict regulatory compliance standards, system 200 may include one or more mechanisms to ensure a higher level of security and to help keep information private. Legislation such as the Sarbanes-Oxley Act (SOX), Gramm-Leach-Bliley Act (GLBA) and the Health Insurance Portability and Accountability Act (HIPAA) specify requirements for information security. A component of the Gramm-Leach-Bliley Act, the Safeguards Rule, requires all financial institutions to design, implement and maintain plans for the protection of private information.

Load Balancer

In various embodiments, system 200 includes load balancer 230. Load balancer 230 includes hardware and/or software elements configured to provide advanced MFT through load balancing transfers between one or more node or servers of MFT domain 210. In one aspect, load balancer includes a software load balancer deployed to distribute incoming managed file traffic among the multiple nodes in MFT domain 210. In one aspect, a separate instance of the software load balancer may be instantiated for each protocol that will be used (e.g., HTTP, FTP, FTP-SSL & SSH-FTP). In one embodiment, the software load balancer includes a standalone java application that is configured to run outside the purview of an application server. In a further embodiment, the software load balancer is able to manage transfers to multiple nodes in (e.g., multiple managed file transfer servers) in a cluster. Therefore, in one embodiment, only one instance of the software load balance needs to be deployed.

It should be noted that while MFT domain 210 is placed behind an internal firewall while is on DMZ, it should be readily apparent to those skilled in the art that other options or configurations can exist. As depicted in FIG. 2, load balancer 230 is placed in a demilitarized zone (DMZ) to distribute FTP and HTTP requests among multiple available nodes in MFT domain 210. Accordingly, load balancer 230 provides a front end to any nodes or servers of MFT domain 210.

In one embodiment, load balancer 230 provides a standalone command line application that can be run outside the purview of an application server. Load balancer 230 supports a variety of protocols, such as FTP/FTP-SSL/SSH-FTP, as well as keystore for FTP-SSL. Load balancer 230 further may support a java keystore for SSL connections. Load balancer 230 may further support a weblogic keystore i.e. KSS In further embodiments, load balancer 230 provides for fail-over handling. Load balancer 230 detects if any node goes down and will not forward any traffic to that node. If a failed node comes up, load balancer 230 can detect that event as well and resume start forwarding traffic to the node.

In one aspect, load balancer 230 implements one or more of a variety of load balancing algorithms and load distribution algorithms. In one embodiment, load balancer 230 provides round-robin distribution of traffic among active nodes. In another embodiments, load balancer 230 provides weight-based distribution in which traffic is distributed among active nodes based on a configured weightage (e.g., no. of requests or in terms of data transfer). Configuration of a weightage may be static, for example, in that it is specified by an administrator and never changes. In another example, load balancer 230 may dynamically monitor runtime information as adjust the weightage.

In another aspect, load balancer 230 supports active Mode and passive mode FTP. Moreover, when implemented in software, load balancer 230 incurs minimal overhead and allows users to experience almost the same speed as when natively accessing a server.

MFT Load Balancer Configuration

In some embodiments, load balancer 230 is instantiated using a configuration file. Accordingly, an administrator may create a master or temple configuration and adapt the temple to a variety of protocols or network topologies. In one embodiment, load balancer 230 is instantiated using a human-readable configuration file, such as an XML file, according to a predetermined schema.

Figure 3:
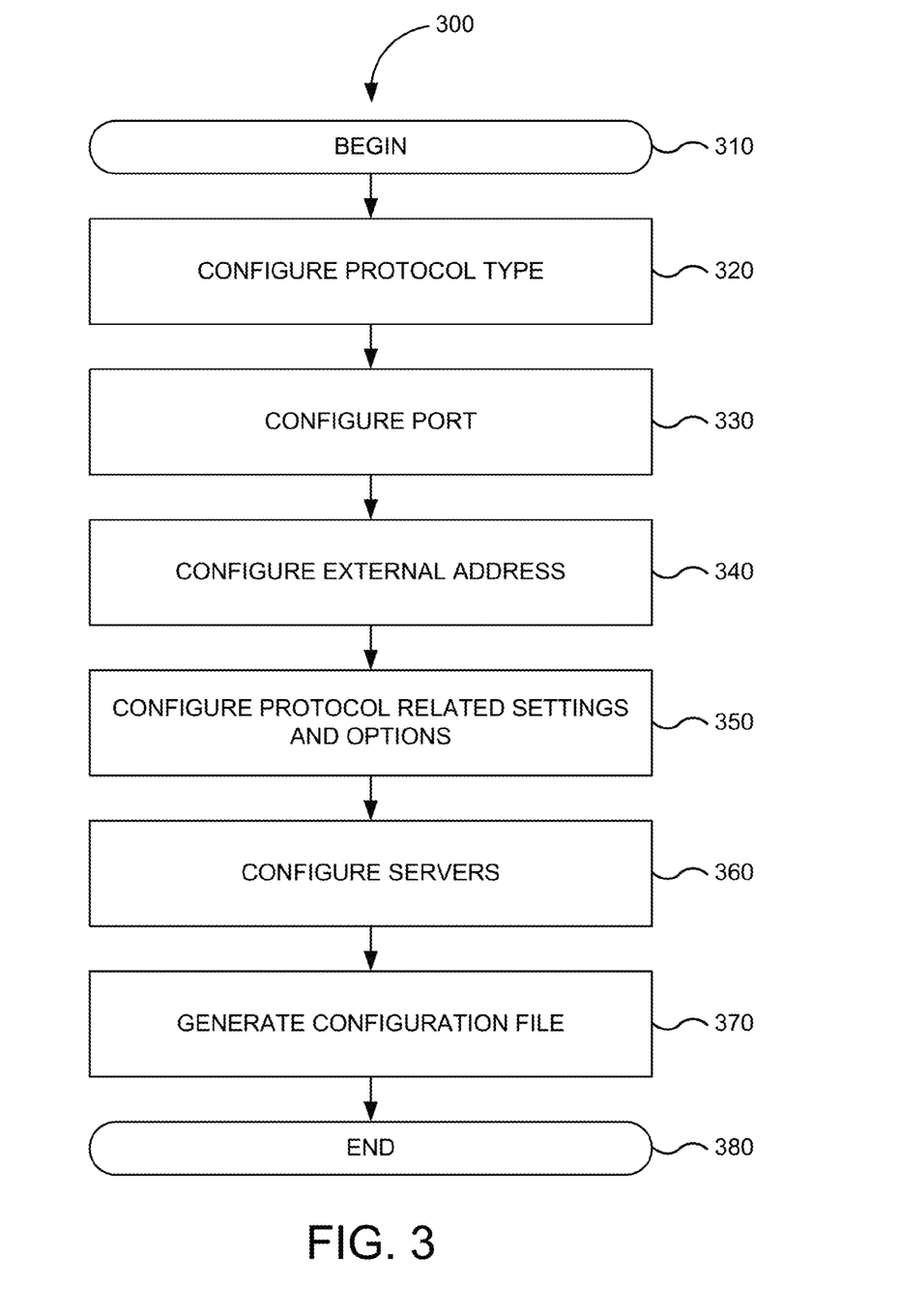
FIG. 3 is a simplified flowchart of a method for configuring a software load balancer in one embodiment according to the present invention.

FIG. 3 is a simplified flowchart of method 300 for configuring a software load balancer in one embodiment according to the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, one or more protocol types are configured. The protocol for which a user wants to run load balancer 230 may include FTP, FTPS, or SFTP, among others. In some embodiments, load balancer 230 is configured to support only a single protocol. In other embodiments, load balancer 230 may be configured to support multiple protocols.

In step 330, one or more ports are configured. For example, an administrator specifies one or more ports at which load balancer 230 is to be reached by external clients. In step 340, one or more external addresses are configured. For example, an administrator specifies one or more addresses at which load balancer 230 is to be reached by external clients.

In step 350, one or more protocol related settings or options are configured. Such settings or options may include, for example, a port or port range to be used to handle active or passive mode sessions. Other settings or options may relate to underlying network or transport protocols that may be used to provide data channels, provide communication channels, and the like. In further embodiments, load balancing or distribution settings are provided to indicate how to distribute transfers among nodes.

In step 360, one or more servers are configured. In this step, an administrator provides one or more indicia of internal servers to which transfers are to be distributed. In one embodiment, the administrator may provide a fixed list of addresses and ports. In another embodiment, an administrator may a range of addresses and/or a range of ports allowing load balancer 230 to automatically discover available nodes. For example, a specification of a port range between 10100 to 10200 configures load balancer 230 to detect one or more servers having an open port within the specified range. In another example, a specification of an address range may include a number range, such as 10.10.10.1-10.10.10.10, or a wildcard, such as 10.10.10.*. Load balancer 230 detects servers having an address within the specified address range.

In step 370, a configuration file or specification is generated. As discussed above, the configuration file may be creating using an XML schema and deployed as an XML file. This allows users to easily create new configurations as well as adapt existing configurations to new scenarios or deployments. Additionally, behavior of an instance of load balancer 230 may be changed dynamically with a new configuration file. FIG. 3 ends in step 380.

Figure 4:
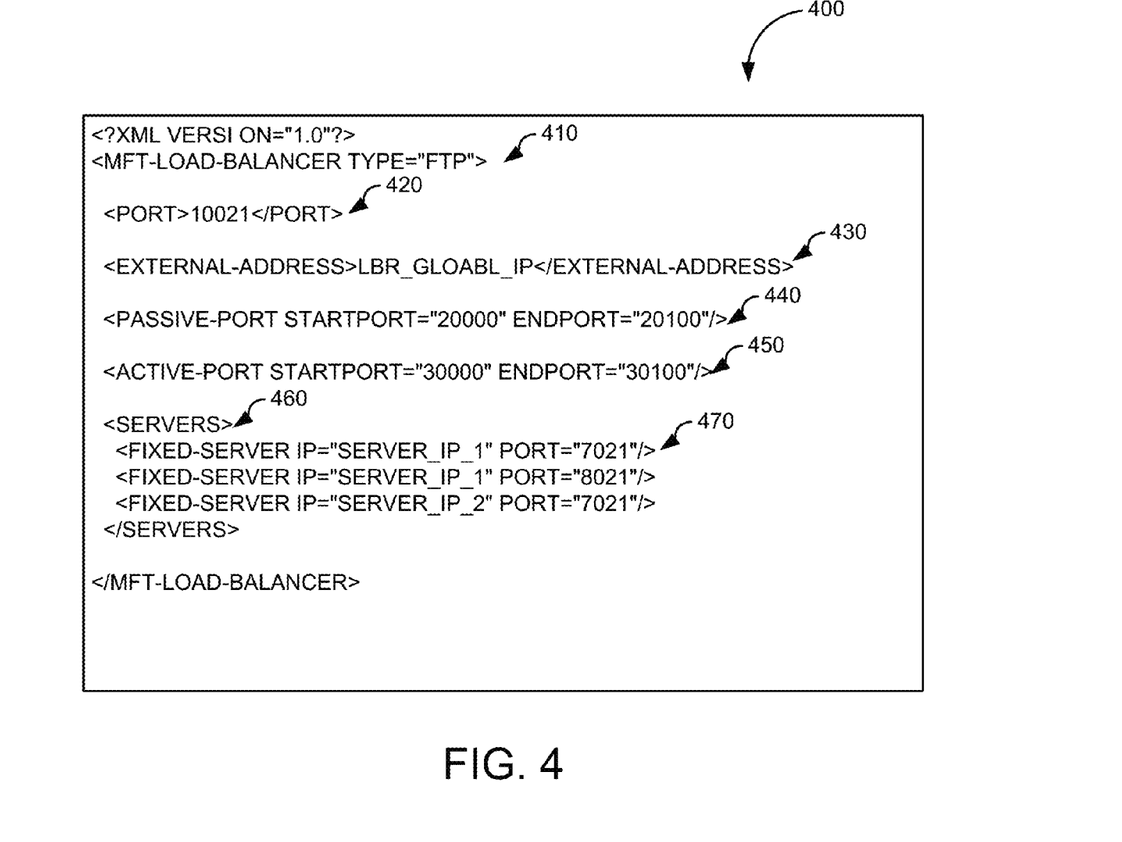
FIG. 4 is a sample configuration file that may be used to configure an instance of a software load balancer in one embodiment according to the present invention.

FIG. 4 is a sample configuration file 400 that may be used to configure an instance of a software load balancer in one embodiment according to the present invention. In this example, configuration file 400 includes a specification for a load balancer of type "FTP" meaning that the instance will manage FTP transfers as configured. Port section 420 specifies the port or ports at which the instance may be reached by external clients. Address section 430 specifies the address or addresses at which the instance may be reached by external clients.

Passive-port section 440 is indicative of one or more protocol settings or options. In this example, a port range is specified for use by passive FTP transfers and sessions. Active-port section 450 is also indicative of one or more protocol settings or options. In this example, a port range is specified for use by active FTP transfers and sessions.

Servers section 460 is indicative of one or more servers for which the instance will provide load balancing and distribution services. In this example, fixed-server section 470 explicitly defines the address and port of a given server in a list of servers that will be serviced by the instance.

Figure 5:
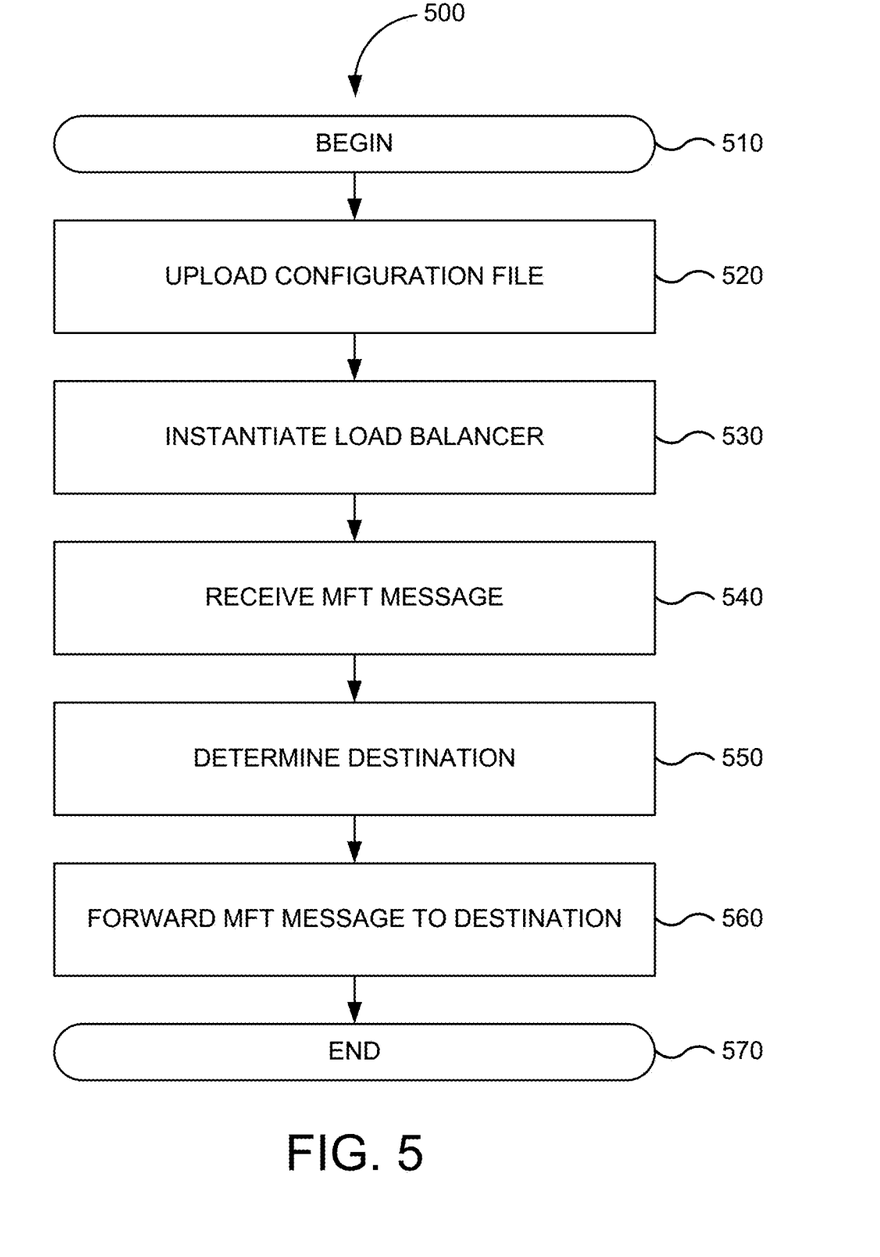
FIG. 5 is a simplified flowchart of a method for utilizing a software load balancer in one embodiment according to the present invention.

FIG. 5 is a simplified flowchart of a method for utilizing a software load balancer in one embodiment according to the present invention. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, a configuration file is uploaded. In various embodiments, the configuration file is uploaded or otherwise communicated to hardware configured to generate an instance of a software load balancer from the configuration file. In one aspect, the software load balancer may execute concurrently with an application server.

In step 530, an instance of a software load balancer is instantiated. Based on the configuration file, an application server may create an instance of a standalone java application appropriately configured to act as load balancer 230. In various embodiments, a single configuration file may be used to instantiate a plurality of instances on a plurality of application servers. In additional embodiments, one configuration file may be used to instantiate several instances on a single application server.

In step 540, an MFT message is received. In step 550, a destination is determined for the MFT message. In step 560, the MFT message is forwarded to the determined destination. FIG. 5 ends in step 570.

In one aspect, a configured instance of a software load balancer may implement a round robin algorithm. For example, load balancer 230 may distribute traffic in round robin fashion in which a first request will be send to a first node, a second request sent to a second node, and the like. In various embodiments, load balancer 230 may support sticky sessions, meaning that if a user's first request is sent to node2, load balancer 230 may ensure that subsequent requests using the same session will also be sent to node2.

In another aspect, a configured instance of a software load balancer may implement a weight-based algorithm. For example, load balancer 230 may distribute traffic using any number of metrics or criteria and their associated weightage. In a first variant, load balancer 230 distributes traffic according to a number of requests being handled by each node. In another variant, load balancer 230 distributes traffic based on weightage of each node. For example, if two servers or nodes are assigned a weightage 60% and 40% respectively, load balancer 230 will attempt to distribute 60% of any requests the first server. Load balancer 230 distributes the remaining 40% of the requests to the second server. In an additional variant, load balancer 230 distributes traffic based on data transfer statics associated with each server. For example, if there are two servers with weightage 60% and 40% respectively and if multiple files are to be uploaded/downloaded totaling 100 GB in size, load balancer 230 may distribute traffic in such way that 60 GB of data is transferred using the first server and 40 GB of data is transferred using the second server.

In still further aspects, a configured instance of a software load balancer may implement fail-over handling. For example, load balancer 230 may maintain a history or keep track of active nodes as well as in-active nodes. If any active node goes down, load balancer 230 remove the node from an active nodes list or otherwise designate the node as inactive. Load balancer 230 no longer directs traffic to that node. In some embodiments, load balancer 230 regularly or periodically checks to determine whether any nodes marked or otherwise known to be inactive is now in an active or ready state. If a failed or inactive node comes up, load balancer 230 may add the nodes back to the active nodes list or otherwise designate the node as active. A time interval for checking in-active nodes may be configured using a variety of techniques.

In various aspects, a configured instance of a software load balancer may implement session or transfer resume.

Figure 7:
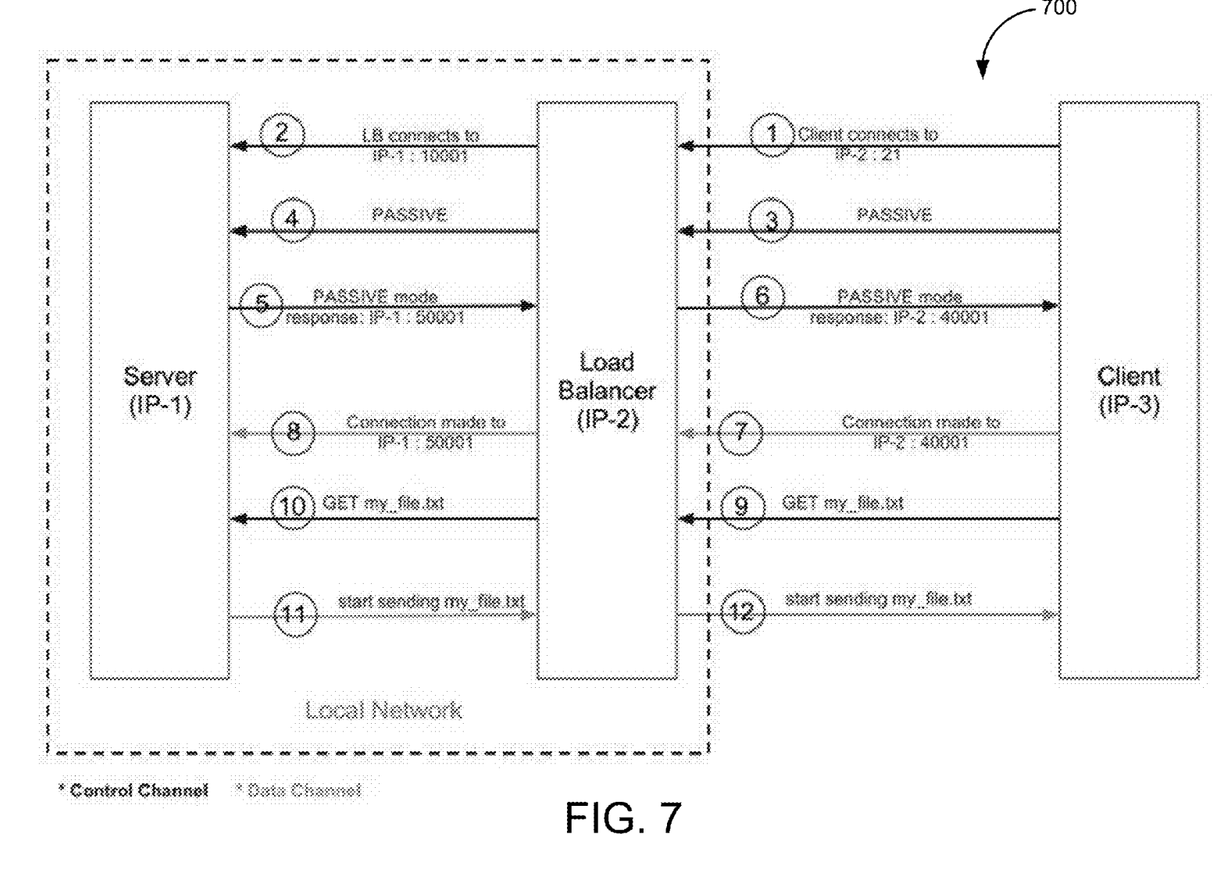
FIG. 7 depicts flow control implemented by a software load balancer for a passive file transfer protocol (FTP) session in one embodiment according to the present invention.

Table 1 illustrates that file upload/downloads through using a software load balancer as described and configured herein is at per with the upload/download directly on a server. Table 1 provides a matrix mentioning upload time (in sec.) for different file sizes, which shows there is little overhead of accessing files using a software load balancer as discussed herein.

tion. In passive mode, a client connects with a server on a given port. This is known as a control channel. Commands are sent through this channel. For actual data transfer, the client will send a PASSIVE command and then requests a new port. In response of this, the server opens a new port and sends it to the client. The client then connects to this port. This is known as a data channel. In step 1, FTP Clients (IP-3) connect to LB (IP-2) on port 21. In step 2, LB forwards the request to server (IP-1: 10001). In step 3, a client sends a PASSIVE command and requests a new port.

In step 4, LB forwards the PASSIVE command to server. In step 5, the server opens a new port 50001 and sends the port to IP-1: 50001 for the data channel. In step 6, LB interprets the PASSIVE command response, changes the response to IP-2: 40001, and sends the changed response to the client. In step 7, the client connects to IP-2: 40001 and opens the data channel.

Figure 8:
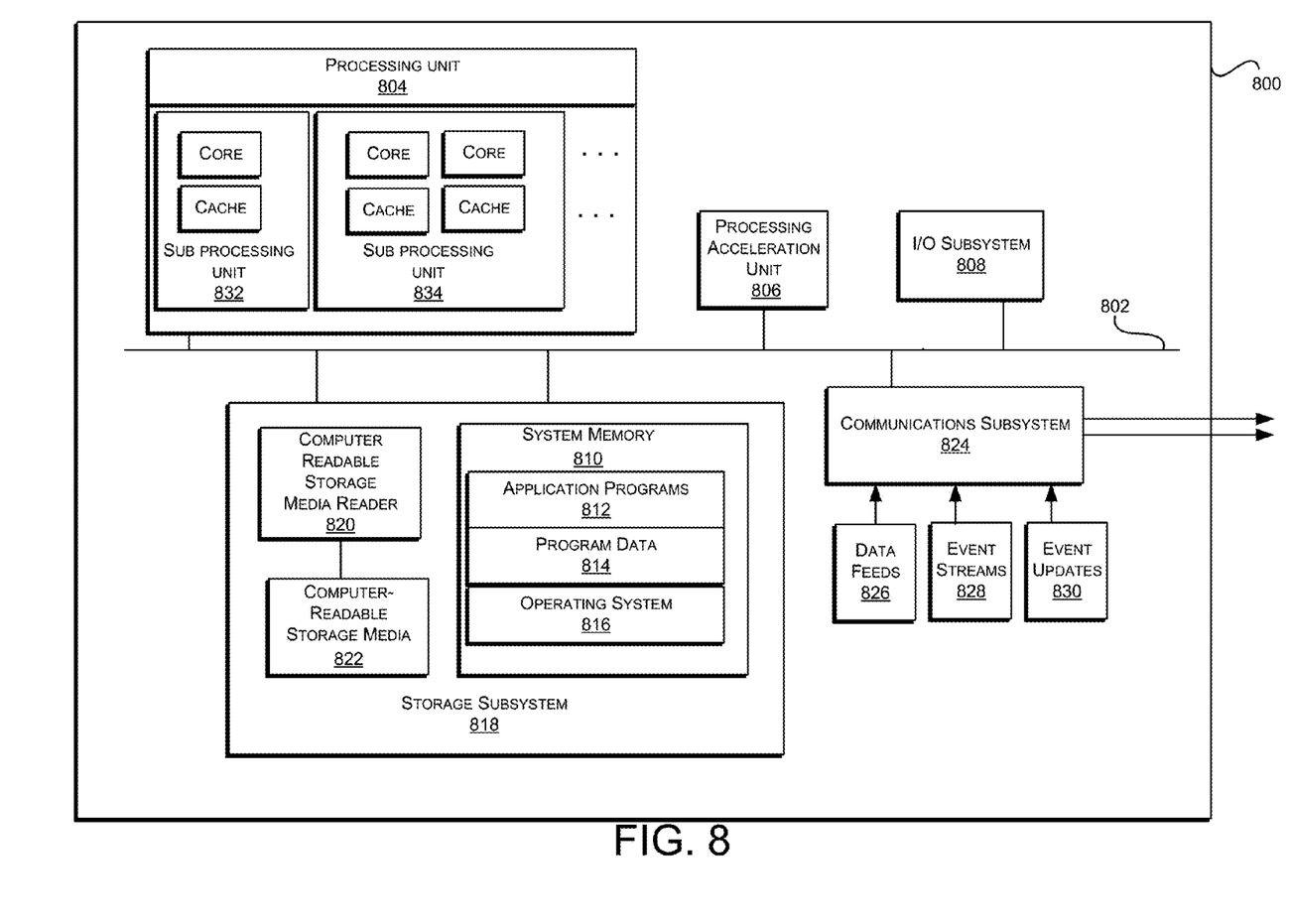
FIG. 8 illustrates an exemplary computer system, in which various embodiments of the present invention may be implemented.

In step 8, upon this connection from the client, LB connects to IP-1: 50001 to open its data channel. In step 9, the client sends a GET my_file.txt command. In step 10, LB forwards the GET my_file.txt command to the server. In step 11, the server sends the contents of the specified file, if available, over the data channel to LB. In step 12, LB sends the same to the client using its data channel Conclusion FIG. 8 illustrates an exemplary computer system 800, in which various embodiments of the present invention may be implemented. The system 800 may be used to implement any of the computer systems described above. As shown in the figure, computer system 800 includes a processing unit

TABLE 1

|  | LBR-1st | LBR-2nd | LBR-3rd | LBR-Avg | Direct-1st | Direct-2nd | Direct-3rd | Direct-Avg |
|---|---|---|---|---|---|---|---|---|
| 10 MB | 0.89 | 0.86 | 0.86 | 0.87 | 0.85 | 0.85 | 0.88 | 0.85 |
| 50 MB | 4.42 | 4.41 | 4.42 | 4.42 | 4.40 | 4.41 | 4.44 | 4.42 |
| 100 MB | 8.97 | 8.99 | 8.96 | 8.97 | 8.97 | 8.97 | 9.33 | 9.09 |
| 1 GB | 95.55 | 95.79 | 95.54 | 95.63 | 96.50 | 96.75 | 95.54 | 96.26 |

Protocol Specific Handling

Figure 6:
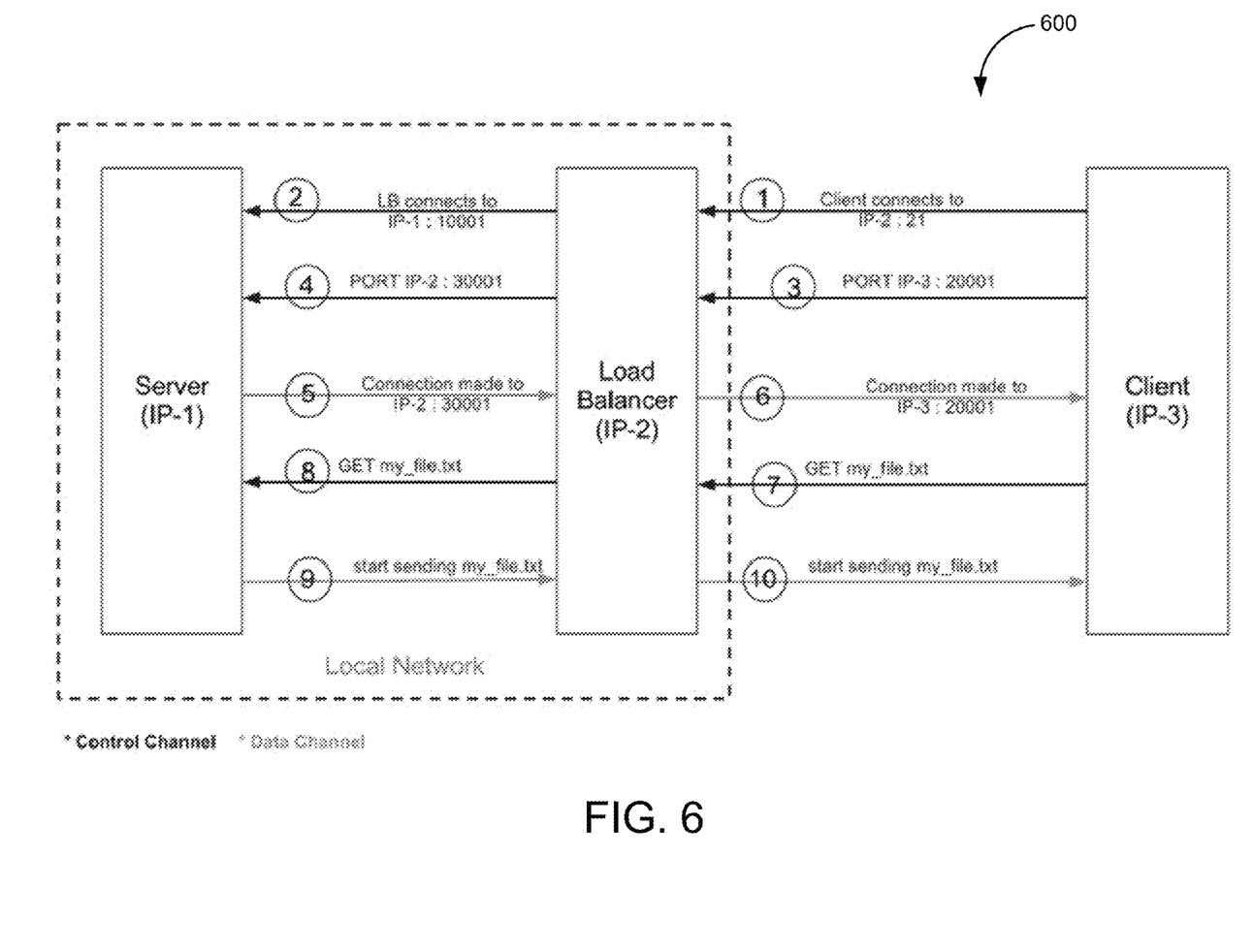
FIG. 6 depicts flow control implemented by a software load balancer for an active file transfer protocol (FTP) session in one embodiment according to the present invention.

FIG. 6 depicts flow control implemented by a software load balancer for an active file transfer protocol (FTP) session in one embodiment according to the present invention. In active mode, a client connects with a server on given port. This is known as a control channel. Commands are sent through the control channel in initiate a session or transfer. For actual data transfer, the client opens a new port and asks the server to connect to this port. This is known as a data channel. In step 1 of FIG. 6, FTP Clients (IP-3) connect to load balancer (LB) (IP-2) on port 21. In step 2, LB forwards this request to server (IP-1: 10001). In step 3, a client sends a PORT command to activate ACTIVE mode. The client asks server to connect to IP-3: 20001.

In step 4, LB interprets the PORT command and asks the server to connect IP-2: 30001. In step 5, the server connects to IP-2: 30001 and opens a data channel. In step 6, upon this connection from the server, LB connects to IP-3: 20001 to open a data channel. In step 7, the client sends a GET my_file.txt command. In step 8, LB forwards the GET my_file.txt command to the server. In step 9, the server sends the contents of the specified file, if available, over the data channel to LB. In step 10, LB sends the same to the client using its data channel.

FIG. 7 depicts flow control implemented by a software load balancer for a passive file transfer protocol (FTP) session in one embodiment according to the present inven-

804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 82.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for providing managed file transfer to a plurality of servers, the method comprising:
receiving, at one or more computer systems hosting an application server, a configuration file;
instantiating, with one or more processors associated with the one or more computer systems, a software load balancer based on the configuration file;
receiving, at the one or more computer systems, a plurality of managed files transfer requests; and
distributing, with one or more processors associated with the one or more computer systems, each of the plurality of transfers between the plurality of servers and one or more clients among the plurality of servers using the software load balancer, the configuration file comprising a protocol specification indicating a type of the plurality of managed file transfer requests to be managed by the software load balancer.

2. The method of claim 1 wherein instantiating, with the one or more processors associated with the one or more computer systems, the software load balancer based on the configuration file comprises executing a standalone command line application using options derived from the configuration file.

3. The method of claim 1 wherein instantiating, with the one or more processors associated with the one or more computer systems, the software load balancer based on the configuration file comprises executing a Java application.

4. The method of claim 1 wherein receiving, at the one or more computer system, the configuration file comprising receiving a text specification of an external port at which the software load balancer can be reached by the one or more clients, an external address at which the software load balancer can be reached by the one or more clients, and internal servers.

5. The method of claim 4 wherein the text specification further defines a range of ports at which the software load balancer automatically discovers the internal servers.

6. The method of claim 4 wherein the text specification further defines a range of addresses at which the software load balancer automatically discovers the internal servers.

7. The method of claim 4 wherein the text specification comprises an XML document.

8. The method of claim 1 wherein distributing, with the one or more processors associated with the one or more computer systems, each of the plurality of transfers between the plurality of servers and one or more clients among the plurality of servers using the software load balancer comprises using a round-robin algorithm.

9. The method of claim 1 wherein distributing, with the one or more processors associated with the one or more computer systems, each of the plurality of transfers between the plurality of servers and one or more clients among the plurality of servers using the software load balancer comprises using one or more weightages associated with the plurality of servers.

10. A non-transitory computer-readable medium storing executable code which when executed by a processor of a computer systems configure the processor for providing managed file transfer to a plurality of servers, the non-transitory computer-readable medium comprising:
code for receiving a configuration file;
code for instantiating a software load balancer based on the configuration file;
code for receiving a plurality of managed files transfer requests; and
code for distributing each of the plurality of transfers between the plurality of servers and one or more clients among the plurality of servers using the software load balancer, the configuration file comprising a protocol specification indicating a type of the plurality of managed file transfer requests to be managed by the software load balancer.

11. The non-transitory computer-readable medium of claim 10 wherein the code for instantiating the software load balancer based on the configuration file comprises code for executing a standalone command line application using options derived from the configuration file.

12. The non-transitory computer-readable medium of claim 10 wherein the code for instantiating the software load balancer based on the configuration file comprises code for executing a Java application.

13. The non-transitory computer-readable medium of claim 10 wherein the code for receiving the configuration file comprising code for receiving a text specification of an external port at which the software load balancer can be reached by the one or more clients, an external address at which the software load balancer can be reached by the one or more clients, and internal servers.

14. The non-transitory computer-readable medium of claim 13 wherein the text specification further defines a range of ports at which the software load balancer automatically discovers the internal servers.

15. The non-transitory computer-readable medium of claim 13 wherein the text specification further defines a range of addresses at which the software load balancer automatically discovers the internal servers.

16. The non-transitory computer-readable medium of claim 13 wherein the text specification comprises an XML document.

17. The non-transitory computer-readable medium of claim 13 the code for distributing each of the plurality of transfers between the plurality of servers and one or more clients among the plurality of servers using the software load balancer comprises code for using a round-robin algorithm.

18. The non-transitory computer-readable medium of claim 13 the code for distributing each of the plurality of transfers between the plurality of servers and one or more clients among the plurality of servers using the software load balancer comprises code for using one or more weightages associated with the plurality of servers.

19. A system for providing managed file transfer to a plurality of servers, the system comprising:

a hardware processor; and a non-transitory memory storing a set of instructions which when executed by the processor configure the processor to:

receive a configuration file;

instantiate a software load balancer based on the configuration file;

receive a plurality of managed files transfer requests; and distribute each of the plurality of transfers between the plurality of servers and one or more clients among the plurality of servers using the software load balancer, the configuration file comprising a protocol specification indicating a type of the plurality of managed file transfer requests to be managed by the software load balancer.

20. A method for providing managed file transfer to a plurality of servers, the method comprising:

receiving, by a computer, a port specification;

receiving, by the computer, an address specification;

receiving, by the computer, a protocol specification;

receiving, by the computer, a server specification; and generating, by the computer, a software load balancer configuration file based on the port specification, the address specification, the protocol specification, and the server specification, the protocol specification indicating a type of a plurality of managed file transfer requests to be managed by the software load balancer;

wherein an application server creates an instance of the software load balancer in response to receiving the software load balancer configuration file.

* * * * *

UNITED STATES PATENT AND TRADEMARK OFFICE
CERTIFICATE OF CORRECTION

| | | |
|---|---|---|
| PATENT NO. | : 9,811,359 B2 | Page 1 of 1 |
| APPLICATION NO. | : 14/685808 | |
| DATED | : November 7, 2017 | |
| INVENTOR(S) | : Bansal | |

It is certified that error appears in the above-identified patent and that said Letters Patent is hereby corrected as shown below:

In the Specification

In Column 6, Line 40, after "KSS" insert -- . --.

In Column 10, Line 24, after "channel" insert -- . --.

Signed and Sealed this
Third Day of July, 2018

Andrei Iancu
*Director of the United States Patent and Trademark Office*